Jan. 18, 1966 E. J. SUPERNOWICZ 3,230,517

EXTERNAL FIELD MAGNETIC HEAD

Filed Sept. 24, 1962 2 Sheets-Sheet 1

INVENTOR.
EDWARD J. SUPERNOWICZ

BY John J. McCormack

United States Patent Office 3,230,517
Patented Jan. 18, 1966

3,230,517
EXTERNAL FIELD MAGNETIC HEAD

Edward J. Supernowicz, San Jose, Calif., assignor to International Business Machines Corporation, New York, N.Y., a corporation of New York Filed Sept. 24, 1962, Ser. No. 225,630
7 Claims. (Cl. 340—174.1)

This invention relates in general to magnetic transducers and more particularly to those transducers having an array of field-shaping, flux-directing elements.

In the process of magnetically recording digital information for data processing systems, it is common to use the conventional ring head so as to record in the longitudinal direction of the medium. Such ring heads record by virtue of the flux discontinuity created at the surface of the recording medium by the gap in the ring head against which that surface bears. In this common method of recording, the medium surface is brought into contact with the ring head at the gap area, since this renders the effective recording field constant and sufficiently intense. Constant close spacing is crucial since field values are extremely critical in the direction normal to the surface. As a consequence, such ring heads must be very carefully shaped and machined so as to fit closey anld uniformly against the medium. But these heads are constantly subjected to the frictional action of the medium as it slides over the head. As a result, the erosion of these costly ring heads is severe and their life expectancy is, unfortunately, short.

The present invention greatly extends head life by using an external head piece on the opposite side of the record, which piece is adapted to allow the ring head to remain out of contact with the medium and which itself may be easily placed in rubbing relationship against the passing medium and yet maintain constant recording characteristics even though it is constantly being eroded. To accomplish this, the invention contemplates a "flux-shaper" comprising a thin laminar sheet of magnetic material to shape and direct the flux emanating from the gap of the ring head and thereby provide a flux discontinuity in a greatly reduced area of the passing medium and thus "write" on the medium by reorienting the attitude of its magnetic domains. Such a thin sheet of magnetic material will have the advantage, over the ring head alone, of being able to be eroded without diminishing its recording potentialities and also of being cheap, easy to fabricate and, therefore, inexpensive and readily replaceable.

In the conventional ring heads referred to above there is often the alternate problem of "floating," or supporting, the ring head in a constant spaced relation from the passing medium (for example, magnetic tape). Such may be the case when the head is to be moved past the medium or when, to reduce friction, a pressurized gas layer is provided between the head and the medium. It is seldom easy to float conventional ring heads, especially in view of the criticality of tape spacings (the order of a tenth of a mil) and since tape speeds are so great (up to 1000 in./sec.). Hence, the weight and bulk of the conventional ring head usually offers a support problem to workers in the art. The "flux-shaper" of the present invention offers a radical reduction in weight and bulk in that it may be simply a thin (the order of $10^{-9}$ centimeters) film of material which is also in an easily-supported, planar form. This problem is further alleviated by the above mentioned advantages that no harm is done to the shaper when the tape bears against it (unlike conventional heads) since what little wears off the light shaper need not affect its conformation or tape spacing. It is simply kept lightly biased against the medium.

The gap lengths of conventional ring heads are today becoming increasingly critical as bit-density is pushed higher. The need for the finely shaped, delicately machined gaps of the prior art ring heads is to reduce the gap length and therefore the recorded bit length, thus increasing bit density. It is well known that such reduction in gap lengths is an unsatisfactory way to increase bit-density since it becomes increasingly more difficult to achieve these close tolerances when fabricating complex head shapes and, moreover, this approach gives rise to the disadvantage of an ever-increasing spacing criticality as the gap is reduced Hence, as one reduces the gap length in a conventional ring head he necessarily introduces an attenuation of flux density in a direction perpendicular to the ring head and therefore makes his ring-to-tape spacings ever more critical and suffers a loss in the flux density penetrating into the medium Neither of the above disadvantages is inherent in the present invention since the bit length is dependent not upon the gap length but upon the width of the external head and this may be made, effectively, as small as you please. Thus, the use of the present invention will necessarily make the bit length a fraction of that inherent in conventional heads and will, of itself, increase bit density over that heretofore possible Prior art bit lengths are a minimum of 100 microinches as opposed to the 1 microinch or less bit-length feasible with the present invention It is well known that the conventional ring heads are relatively expensive to fabricate and require special techniques, especially to machine a gap of microinch order of magnitude uniformly. These specialized fabrication processes required for ultra-fine gaps and the need for flat, closely-machined ring surfaces, on which the medium must ride, are eliminated by the present invention Since specialized head fabrication techniques can be minimized, the cost savings for head fabrication become apparent. Such savings are inherent in the external shaping head of this invention wihich makes the fussy shaping of an ultra-small gap and the close tolerances of prior heads unnecessary, since the bit length is not defined by the gap and the medium need not ride upon the record surface.

The fabrication of the "flux-shaper" itself is extremely simple and inexpensive consisting merely in the forming of a thin sheet of magnetic material of relatively uniform thickness. Such a sheet could easily be formed by conventional electroplating or sputtering techniques if a very thin shaper and small bit length is desired and may utilize a substrate of non-magnetic material, if desired. This also makes the replacement of a worn head (which, as noted above, is much less frequent than in the prior art) less expensive since one merely inserts a new inexpensive sheet.

A further saving is the reduced expense and complexity in a recording system using the invention by virtue of the fact that, being easily fabricated in the form of a sheet or square of magnetic material, my head is easily mounted and easily maintained in a constant recording spacing from the medium. Another, less ebvious, saving is due to the fact that the external head may consist of simply substrate of cheap, non-magnetic material over which is laid an ultra-thin layer of magnetic material, conveniently plated thereon in any desired configuration. This effects a great conservation in the amount of expensive magnetic material necessary in prior art head fabrication, and results in very little loss in the magnetic material or properties as the head is worn away, unlike the prior art ring heads. Fabrication convenience results from the fact that virtually any shape of magnetic material may be plated upon the substrate used and the shape need only be plated upon the substrate through a convenient mask as opposed to the prior art fabrication of the entire head shape requiring intricate machining steps.

Conventional, high-resolution ring heads are being fabricated with gaps as small as a few microinches. Two adverse effects become noticeable with such minuscule gaps: a shunting effect across the gap which reduces sensitivity and the increased likelihood of saturation of the head core. This decreases the efficiency of the head, of course, and is, therefore, very undesirable. The external field head of the present invention avoids these difficulties by a shaping of the external recording field and decreasing bit densities without depending upon the ring and gap alone, thereby reducing the criticality of the ring gap.

Prior art magnetic recording heads suffer from the "gap effect." This effect is customarily referred to in terms of gap length (since practically all modern reproducing heads are ring heads). The effect is noticed when the wave lengths to be reproduced are of the same order of magnitude as the limit of resolution of the readout device. Like every measuring instrument, a magnetic head has its resolution limit, failing at some point to further resolve recorded wave lengths. This limit is very close to the ideal theoretical minimum that can possibly be achieved with present day conventional ring heads; namely, 500 microinches. These small gaps are not practical however because the results of recording with them are too erratic as noted before. Minute particles, or burrs, between the tips can cause such a large percentage variation in the effective gap length that great pains are required to achieve any degree of uniformity whatever. Consequently, usage of a conventional ring head without the external field head of the present invention places undesirable limits upon the minimum wave length (or maximum frequency) that can be recorded; namely, about 500 microinches. By contrast, an "external field head" system of the instant type may theoretically yield recording resolution in the one microinch range since unlike the prior art tis resolution limit is determined by the width of the external head magnetic sheet which, in turn, may be of the order of magnitude of one Angstrom.

A further advantage over prior art ring heads is the reduced penetration losses at short wave lengths. Due to this effect, the material most distant from the gap will not be magnetized to the same extent as that which is closest. Such a loss, using conventional ring heads, would be in the order of 5 db at 4000 cps. The location of the shaping head opposite the external field of the invention obviously greatly reduces this loss in penetration since the writing flux of necessity traverses the entire cross-section of the tape.

In the prior art, magnetic readout is often interfered with by the background noise created by stray magnetizations remanent on the recording media. The present inventive recording head helps to solve this problem of detecting of the "writing" signal over such a noise background. By virtue of its shaping-effect, the inventive head inherently increases flux density beyond that of any "unshaped" passage of stray flux or background flux through the tape. Thus, the readout signal as written by the instant device will necessarily be stronger than any background remanent magnetization. Such a noise reduction becomes increasingly important in the high frequency, high bit-density applications for which this head is peculiarly apt.

The present device alleviates all of the above-named problems and achieves its specific advantages according to its field-shaping, flux-shunting characteristics. Its advantageous features may be summarized as follows: Whereas in conventional ring heads the bit length is necessarily some increment of the gap length, use of the external field-shaping means according to the invention makes the bit length necessarily smaller than the gap length. The recorded bit also exhibits deeper recording penetration by virtue of using the flux-shaper of the invention, whereby a "gating" effect is achieved when the shaper "pulls" a substantial portion of the flux through its point of tangency with the tape according to its shunting effect on the flux, namely by offering a lower reluctance path cutting off flux lines. If the shaping sheet is infinitesimally thin, as it may be, then the "return path" for the flux, thus "pulled in" and concentrated, will be almost the same as the "enter path" and the flux will thus be shaped and concentrated there for writing. Thus, flux density is greatly increased at the points of tangency between tape and shaper. This increased density, where the magnetic sheet touches the tape, is the "flux-density-discontinuity" whereby "writing" is performed in a medium according to the invention.

It is therefore an object of the present invention to provide a magnetic recording transducer whcih includes a thin magnetic sheet touching the medium opposite the field-producing means and shaping the field for writing purposes.

Another object is to provide a composite transducer having a gap wherein bit-lengths may be made smaller than the gap dimension.

A further object is to provide a magnetic ring transducer which may write on a medium without itself touching the medium.

Another object is to provide a magnetic recording transducer a portion of which may be a mere thin film of insignificant mass and therefore easily supported.

A further object is to provide a magnetic head having, as its only wearing element, a thin foil of magnetic material which is both inexpensive and of non-destructive erodiability so as to achieve a long operative life and low initial cost.

Yet another object is to provide a modified ring head having a writing element with a bit-length less than a ring gap length, thereby increasing resultant bit density.

Yet a further object is to provide a magnetic transducer of the thin magnetic sheet type which, for readout purposes, can accommodate higher bit densities without substantial loss in resolution.

A better understanding of my invention may be had by reference to the full description below taken in conjunction with the accompanying drawings wherein.

Figure 1:
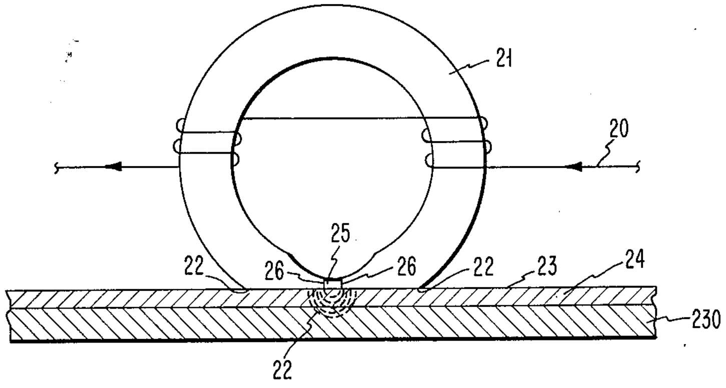
FIG. 1 PRIOR ART
FIG. 1 shows a conventional prior art ring head in elevational view.

In the illustration shown in FIG. 1 there appears a representation of a typical prior art ring head. This ring head is arranged to show part of the typical flux pattern emanating from the gap area 25 with which the head 21 writes upon the recording surface 23. Surface 23 is, typically, magnetic tape having backing material 230. The ring head 21 is shown schematically and illustrates how the tapered edges 22 of the ring necessarily abut the tape 24, rubbing against it. This frictional contact will erode these edges so as to produce a distorted ring configuration after some period of usage and is typical of most prior art ring heads. The life of such a head would typically be a few thousand feet of tape usage at which time the head 21 will have to be removed and either resurfaced or replaced. This problem involves the expense of down-time, servicing and new or refurbished parts. Moreover, particularly in closely packed head arrays, it is very difficult to find and locate a defective, eroded ring-head and it is desirable therefore to have a long-lived ring head which need not be inspected or replaced. This disadvantage becomes crucial in an application demanding a fail-safe operation like that of a recorder in a satellite vehicle where the failure of the recording head would impair the gathering or transmission of vital information. This problem might be soluble if the ring head 21 could merely be urged against the tape 23 so that, as its edge 22 wore away, new and fresh material on the sub-surface would merely be brought forth and kept in recording relationship. However, it is unfortunately true that as the surface erodes, the shape and magnetic characteristics of the gap, and of the entire core itself, are changed, making it unfeasible to merely bias the head against the tape and let it wear away for a period of time. This is practical with the writing element of the invention, however. It will also be noted that the gap 25 does not extend very high into the interior of the ring 21 and as the recording surface wears away therefore this gap dimension will also change. The shunting material in the gap would be entirely worn away and thus the effective reluctance would change, destructively altering the characteristics of the head.

Besides this erosion problem, there are further difficulties in conventional ring heads which are resolved by the invention. As bit density is increased, and hence bit length attenuated, certain defects creep into the conventional ring head structure, especially at the higher frequencies. One such defect is the loss in depth of recording penetration as the gap is decreased. This means, in practice, that as the length of gap 25 decreases the depth of signal penetration into the tape 23 will, at some point, tend to decrease and thereby reduce the strength of the readout signal. This is especially true at the higher frequencies. The flux-path distorting action of the instant invention tends to channel the writing flux normal to the tape and thereby minimize this loss in depth penetration as the gap length is decreased. This is another way in which the present invention will tend to increase bit density.

Figure 2:
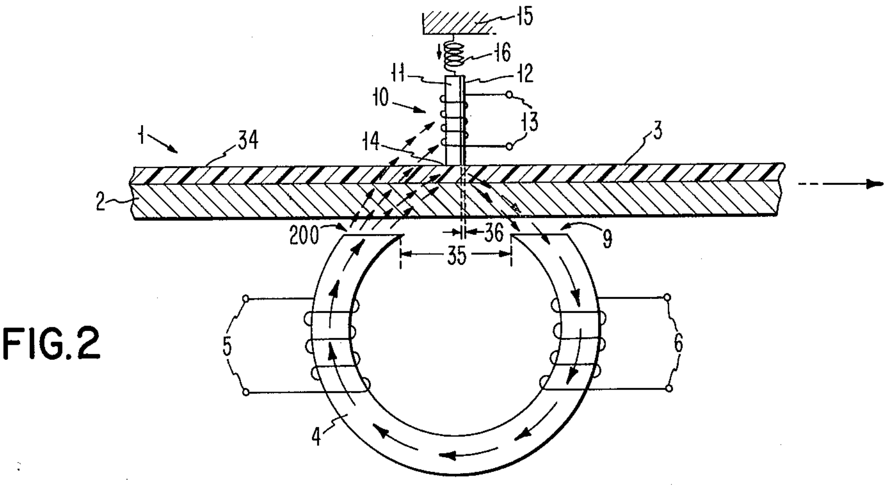
FIG. 2 shows a conventional ring head used in combination with the invention.

Turning to FIG. 2, it may be noted that the shaper element 10 of the invention has been added to the conventional external ring 4 of FIG. 1. Shaper 10 tends to increase the flux density in the recording surface 3 in a region (bit length) 36 which is smaller than the ring gap 35. This "discontinuity in flux density" in region 36 will constitute the recorded bit and determine bit length since it is the mechanism whereby writing is achieved according to the instant invention. Such a bit length advantageously compares with the bit length of the conventional ring head, shown in FIG. 1, which is conventionally wider than the gap length 25. A marked improvement in bit density and in readout resolution is evident when one compares the prior art writing mechanism (of FIG. 1) with that of the invention (cf. FIG. 2), the structural change being the mere addition of flux shaper 10. The writing mechanism is one of flux density variations, as shown by the flux-pattern in FIG. 5. This is very different from the writing mechanism of the prior art (seen in FIG. 6) which maintains a constant flux density and employs a fringing flux mechanism. Unlike the prior art, ring head 4 of the invention is not in contact, at its edges 9, with the tape 1 and (unlike the prior art) is located opposite the recording surface 3. However, ring head 4 is otherwise of conventional construction and may include a record winding 5 and a pickup winding 6 for readout purposes. The gap dimension 35, when using the shaper, is not critical (unlike the prior art) and may vary from 3 to 50 mils and yet still effectively produce a one-to-one bit density. That is, if the shaper thickness is 5 microinches, it will produce 5 microinches of recording. In contrast, a conventional ring head must have a very narrow gap (cf. gap 25 in FIG. 1) in order to achieve small bit dimensions. Typically, head 21 would yield a minimum bit length of 100–200 microinches with a recording oxide layer of 0.5 mil thickness.

It is also apparent that by allowing one to use a larger gap length for a given bit size that the present invention ameliorates the hazard of "shunting" surface anomalies such as dust or unevenness along the sides 26 of the gap 25. This gives a margin of safety against accidental gap-shunting.

Typically, the magnetic shaper 10 may have a non-magnetic substrate 11 of any non-magnetic, easily worked material such as glass, Mylar, copper or epoxy resin. The only requirements for this substrate material would be that it resist erosion and not injure the tape as it is drawn, frictionally, thereacross. A thin magnetic film 12, of the order of a microinch or less thick, may then be deposited on this substrate 11 according to conventional vacuum deposition (or electroplating, or sputtering) techniques so as to completely cover the substrate to a uniform thickness. This thin film may be comprised of any magnetic material having a low retentivity and high permeability characteristics (for example, Mu-metal, iron-nickel, or permalloy). To provide constant contact of the sheet 10 against the tape 1, thereby giving constant recording characteristics, a mechanical biasing means, such as a spring 16 attached to a base 15, may be employed to urge the shaper 10 continually against the tape 1. The face 14 of shaper 10 may be eroded away by the tape without harm since fresh material of the same magnetic dimensions, cross-sectional shape and characteristics will be presented. In this way, the element will maintain uniform recording characteristics despite wear.

Noise problems are reduced by this shaper. In conventional heads, noise becomes a problem when the location and the strength (remanence) of an accidentally recorded bit approaches that of the "writing" remanence. This means that accidental means may produce a "noise" signal comparable to the written signal. This is much less likely with the instant "shaper" element since it "writes" by a process that creates a flux density of a uniquely high level such as would be highly unlikely to be made accidentally. This effectively gives the instant recording combination a higher signal-to-noise potential by virtue of confining or channeling the writing phenomenon to a smaller discrete area than does the prior art. This difference may be expressed as one of "point-recording" vs. "line-recording"—the instant writing mechanism involving flux density variation as opposed to the mere imposition of a given pattern of flux density in the prior art.

A further advantage achieved with the flux shaper of the invention, is the decrease in "surface effects" at shorter recording wave lengths. In the high frequency region of recording, the output level from tapes recorded with conventional means ceases to correspond to the tape thickness and begins to decrease exponentially with decreasing wave lengths. This is true because only those recordations in the portions of the medium lying closest to the pole pieces of the ring head will be coupled with the readout pole pieces during playback. This effect is minimized when one writes using an external magnetic shaper to direct the writing field through the medium, allowing constant recording penetration. In using the shaper for readback, magnetic coupling of the inner portions of the tape to the shaper-transducer (cf. pickup winding 13 for readback in FIG. 2) will cut the shallower flux loops from a point deep within the recording medium (increased $d\phi/dt$) since the shaper is virtually at zero separation distance from the medium. This separation is the region closest to the medium surface (almost at zero separation) wherein some of the shorter flux loops may fall and be "lost" by prior art "gapped" heads. This amounts to saying that the effective readback gap of the invention is of negligible dimensions.

Figure 3:
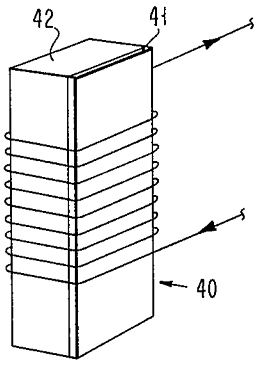
FIG. 3 shows a sectional details of a typical embodiment of the thin magnetic sheet serving as a shaping element.

The fabrication of a typical magnetic shaper for flux-attenuating purposes is indicated in FIG. 3 wherein such a thin sheet 40 is shown in the form of a thin coating 41 on one side of a substrate sheet 42. The ease of coating such a thin film on any convenient substrate is apparent. Low cost and ease of mounting will also result due to the very low mass of such a thin sliver. Conventional microscopic film fabrication techniques can lead to much closer control over the mass of magnetic material and the thickness of the film deposited in the fabrication of such a shaping element.

Figure 4:
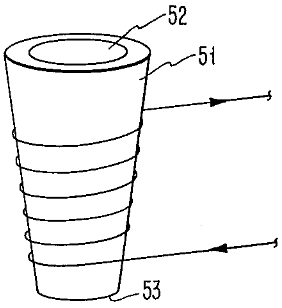
FIG. 4 shows an alternative embodiment of the flux-shaper to that of FIG. 3.
Figure 7:
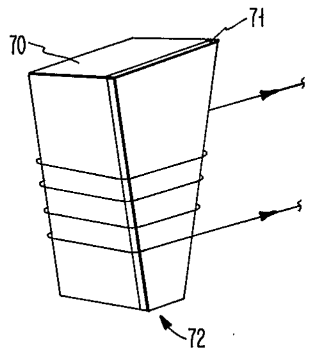
FIG. 7 shows an alternative embodiment to that of FIGS. 3 and 4.

A less obvious advantage of such a recording element is the ease with which one can fabricate it in an almost infinite variety of shaper. Such a simple structure lends itself to easy forming methods and can result in writing elements of widely disparate and variegated shapes. An alternative shape is shown in FIG. 4 wherein the magnetic film 51 is coated upon a substrate 52 of cylindrical, rather than planar, form. Material 52 could also be in the form of a tiny solid rod, the recording end 53 of which is tapered. Such a configuration has high aptitude for narrow-track, discrete-track recording wherein a multiplicity of small, high, bit-density transducers are needed. As is the case of the planar sheet, such a cylindrical flux-shaper being of symmetrical configuration will erode symmetrically maintaining a constant configuration of magnetic materials in abutting relationship against the tape on which it records. Alternatively, a frustroprismatic shaped sheet 70 of substrate could be coated with magnetic material 71 as in FIG. 7. Other field shaping configurations suitable for recording in particular ways upon a medium may be created readily as the need arises, without departing from the spirit of the invention.

Figure 6:
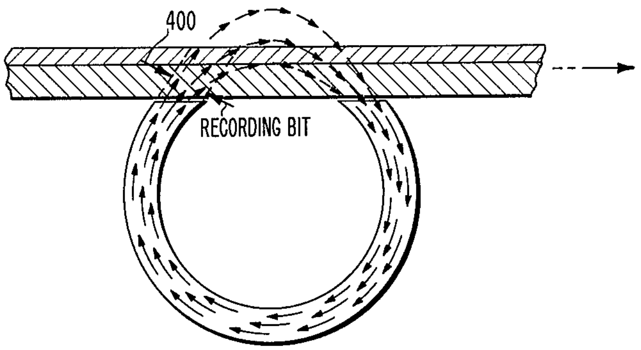
FIG. 6 shows a schematic sectional view of an idealized flux pattern through a tape section using the prior art combination of FIG. 1.

FIG. 6 shows a sectional view of a recording surface in which is schematically represented an idealized flux pattern typical of the prior art. It is apparent from the uniform flux density pattern here, that the writing mechanism in the prior art conventional ring heads is one of the mere impositions of a regular extended flux distribution to create a "bit". Such a bit would typically need to have a longitudinal dimension of the order of at least 400–500 microinches for effective readback—a minimum bit length far greater than the few microinches the present invention allows.

Figure 5:
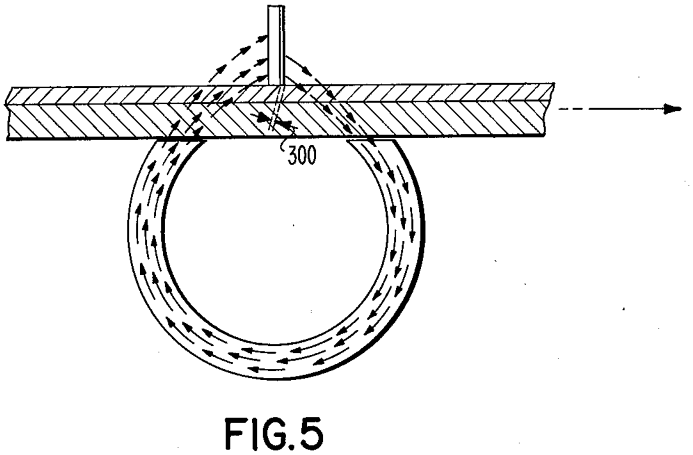
FIG. 5 shows in sectional view an idealized flux pattern through a tape section using the invention.

Reference to FIG. 5 will show, by comparison, the difference in the recording technique of the invention as opposed to conventional ring heads. Here the writing mechanism is effected both by imposition of the magnetic flux and by the shaping and distorting of that flux pattern so as to achieve, at a restricted (bit) point, a significant flux-density discontinuity, the presence of which indicates the writing mode. Thus, where the prior art writes by virtue of the imposition of uniform flux, the present invention writes using a discontinuity in the density of the applied flux. Such discontinuity is, of course, achieved by virtue of the flux-shaping or "gating" magnetic shaper means which provides a low reluctance channel for a substantial amount of flux thereby shunting it into a narrow, high density return path back to its destination pole. This does not mean that the system is thereby rendered a "perpendicular writing" system, however, since it still uses a combination of ring heads which create a magnetic flux and direct it in the longitudinal direction of the tape (a significant component of the resultant flux lies in this direction cf. FIG. 5). Also, the system is to be used, as are prior art ring heads, in combination with tapes having an "easy-magnetization" (or recording) axis in the longitudinal direction. The net effect is not to write in the perpendicular direction but rather to attenuate the longitudinal components of the flux vectors and thereby shorten the bit length. Effective bit lengths of the order of a few microinches may be achieved, as opposed to hundreds of microinches heretofore.

Turning from theory to results, much evidence has been gathered regarding significant, unexpected advantages over prior art methods in typical usage. The invention has shown a hitherto unattainable one-to-one bit resolution. For example, using a magnetic sheet of 0.125 mil thickness (it could be thinner for higher bit density) a recording was produced yielding 10 thousand bits per inch. This compares to an optimum of about 500 bits per inch using commercially available ring heads today. There are the further advantages over prior art head systems of: (1) *gap sizes*: (gap sized bit size) 2 mils vs. 3–15 mils conventional; (2) *reduced cost*: 10 to 100 dollars vs. a few cents; and (3) *reduced mass*: 40 ounces vs. a few grams (for a 5-mil square coated with a $10^{-5}$ cm. film, for example).

In summary, the above explanation should make it evident that the present invention contemplates a new and unobvious method of magnetic recording whereby a conventional transducer, such as a ring head, is placed in field-coupling relation with flux-attenuating means so that a recording medium which passes between these two may be imprinted with a magnetic signal which is indicative of the presence or absence (not of a longitudinal flux of uniform density, as in the prior art) of a flux-density-discontinuity having a "smaller than gap length" dimension. There is also taught a novel readback system wherein the magnetic shaper of the invention is wound suitably with a pickup winding to provide a novel means of detecting remanent magnetic fields of new lower dimensions and effect high resolution readout according to the invention.

It will be recognized that the systems and the methods above described as embodiments of the instant invention may be nonetheless widely varied and the same generic kind of magnetic transduction may be accomplished according to the inventive teaching by using other embodiments incorporating other and various elements or methods, thus modifying or completely supplanting those elements and methods above described. Accordingly, the instant invention should be considered to include all relevant modifications, variations and alternative forms following within the scope of the appended claims.

I claim:

1. Apparatus for magnetically recording electrical signals and for reading back the recorded signals comprising:
   - a magnetic record medium,
   - flux-shaping means of thin, elongated configuration and composed of magnetic material, and
   - magnetic head means having a gap therein substantially wider than the thickness of said flux-shaping means disposed opposite said shaping means so that said shaping means is located substantially within the bounds formed by said gap whereby said shaping means is in field-intercepting relation herewith and whereby, as said medium is passed between said shaping means and said head means, the magnetic flux from said head passing through said medium is concentrated and modified by said shaping means, thus effecting a flux-density-discontinuity with which to magnetically record and thereby increase the resolution of recordation and reduce fringing field effects.

2. Apparatus according to claim 1 wherein said flux shaping means comprises a thin film of high permeability magnetic material which is deposited on a substrate.

3. Apparatus according to claim 2 wherein said flux shaping means is of cylindrical form whose diameter is substantially less than the distance of said gap and whose cross-section lies substantially within the bounds formed by said gap.

4. Apparatus according to claim 1 wherein said magnectic head means comprises:
   - a conventional ring head,
   - a recording winding, and
   - a pickup winding and is spaced apart from, and out of contact with, said medium.

5. The combination as described in claim 2 wherein said flux-shaping means is of frusto-prismatic form.

6. Magnetic recording means for recording on a planar magnetically recordable medium comprising:
   - magnetic head means of the reluctance discontinuity gapped type disposed on one side of said planar medium in flux-intercepting relation thereto, and a continuous flux-shaper means disposed on the opposite side of said medium in flux-density distorting relation with said head means said flux-shaper means presenting to said medium an area less than that presented by the gap of said magnetic head means and being situated substantially within the bounds formed by said gap, whereby magnetic recording may be effected by creating flux-density-discontinuities in said medium.

7. The recording system as described in claim 6 wherein said flux-shaping means comprises a thin planar sheet of high permeability magnetic material, disposed essentially normal to said medium and essentially parallel to the longest dimension of said gap.

References Cited by the Examiner

UNITED STATES PATENTS

| | | | |
|---|---|---|---|
| 2,804,506 | 8/1957 | Schurch et al. | 179—100.2 |
| 2,905,770 | 9/1959 | Kornei | 179—100.2 |
| 3,120,001 | 1/1964 | Supernowicz | 179—100.2 |

FOREIGN PATENTS

| | | |
|---|---|---|
| 429,987 | 6/1935 | Great Britain. |
| 832,580 | 4/1960 | Great Britain. |

OTHER REFERENCES

Pages 89–91, June 30, 1961—Camras et al., Electronics, Outside-coil Magnetic Head.

IRVING L. SRAGOW, *Primary Examiner.*